April 23, 1929.  B. KORNEFF  1,710,362
SYSTEM FOR THE AUTOMATIC IRRIGATION OF THE SOIL
Filed June 22, 1926  2 Sheets-Sheet 1
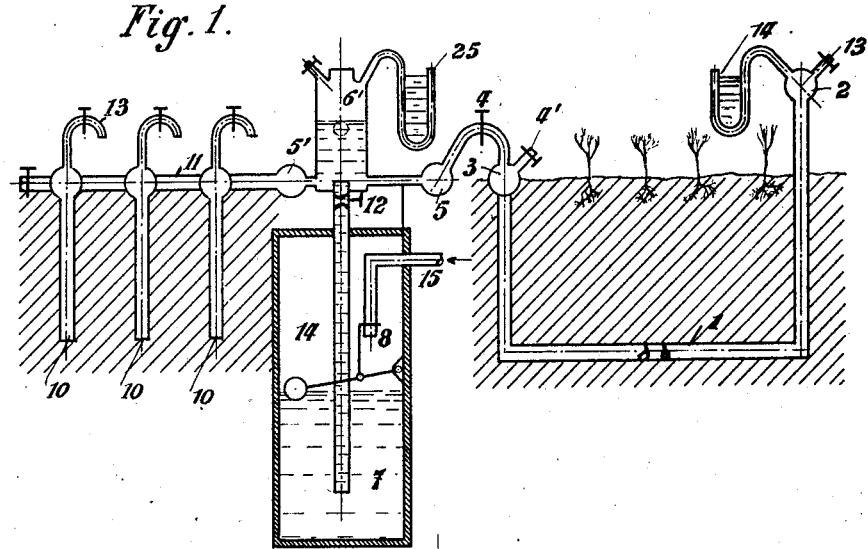
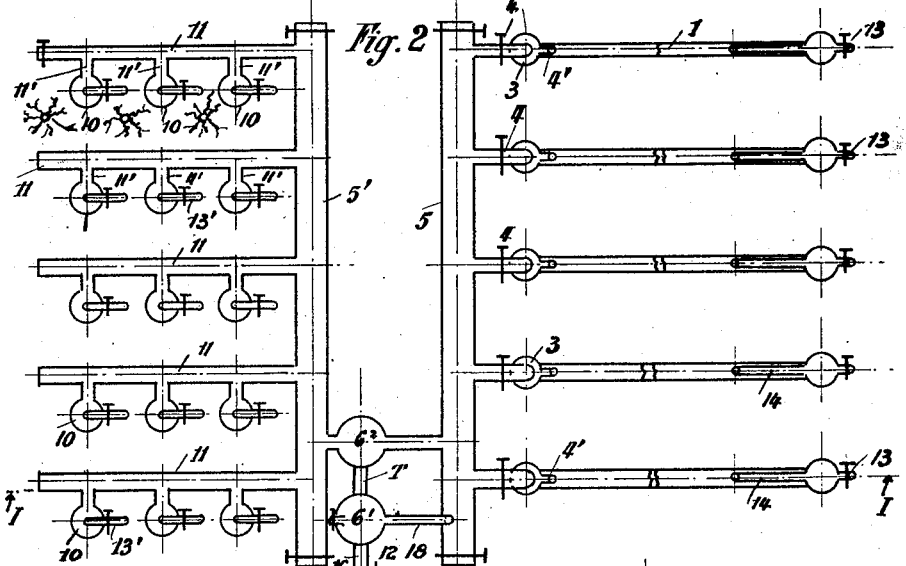
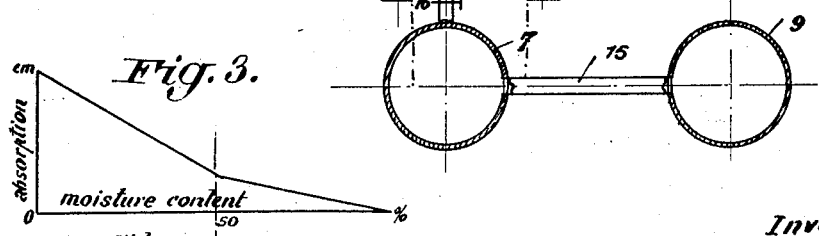
Inventor
Basile Korneff April 23, 1929.   B. KORNEFF   1,710,362
SYSTEM FOR THE AUTOMATIC IRRIGATION OF THE SOIL
Filed June 22, 1926   2 Sheets-Sheet 2

Witnesses:

Inventor:
Basile Korneff
per Fred F. Barlow
Attorney

Patented Apr. 23, 1929.

1,710,362

UNITED STATES PATENT OFFICE.

BASIL KORNEFF, OF PARIS, FRANCE, ASSIGNOR TO SOCIÉTÉ NORD AFRICAINE D'ETUDES & D'ENTREPRISES (SOCIÉTÉ ANONYME FRANCAISE), OF PARIS, FRANCE.

SYSTEM FOR THE AUTOMATIC IRRIGATION OF THE SOIL.

Application filed June 22, 1926, Serial No. 117,873, and in Great Britain June 2, 1926.

The system for automatic irrigation of the soil forming the subject of the present invention is based upon the property of the soil to absorb moisture through porous tubes adapted to allow water to pass through their walls but completely excluding air when moist.

Processes for the automatic irrigation of soil which have been employed up to the present time are not practicable because they have been based upon false assumptions with reference to the aspiration of water by capillary attraction and moreover because the walls of the porous tubes have allowed air and water to pass simultaneously.

My irrigation process about to be set forth has been perfected after a careful study of the property of the soil to absorb and the measuring of this property and after having taken into account the different factors involved. These data have been obtained by means of a measuring apparatus for indicating exactly the power of absorption and the degree of moisture content in the soil.

From a study of the data obtained by the apparatus above mentioned, the following facts have been observed, which facts serve as the basis for the present invention:—

First, the soil can absorb water from all objects containing moisture with a given force of absorption, when the moisture content of these objects is retained with a force which is less than the power of absorption of the soil.

For instance, certain districts in the south of Russia have given a measurement of 58 cm. on a column of mercury.

In the case of heavier soil districts in the north a reading of 53 cm. has been attained.

In the case of sandy soils a reading of 43 cm. has been found.

It is evident from the foregoing that in the case of ordinary soils, the reading may vary from 6 to 8 meters if measured by a water column.

Second, compressed soils absorb water more strongly than light soils. In the case of light clay soil, there is obtained a reading of 46 cm. of mercury, and with the same soil compressed, 51 cm. In the case of light sand soil the reading is 33 cm. and for the same soil when compressed, 39 cm.

Third, the force of absorption for each soil depends directly upon the moisture content of the soil. Dry ground absorbs water to the greatest extent. Saturated soils absorb no water, their power of absorption being equal to zero on the mercury column. The moisture content in the soil of a district is therefore a function of its power of absorption. If this is represented graphically, the abscissa may be considered as the moisture content of the soil, and the ordinate may be considered as the force of absorption, and by this means a curve may be plotted showing the relationship between the moisture content of the soil and the force of absorption.

Fourth, every soil has a natural moisture content which is favorable for agricultural purposes whose value depends on the nature of the soil.

The moisture content is maintained at the surface of each particle of earth in the form of a film, by reason of molecular forces. It cannot be rapidly changed in the layers of earth and on this account is of little use for plants. Capillary distribution, which depends upon the capillary action of the soil, closes the pores of the soil and prevents the access of air to the lower layers of the soil thus producing soil of a marshy nature.

Fifth, the force of absorption of any particular soil, from the standpoint of the existing moisture content differs therein according to the nature of the district, and the value thereof may be determined by a device for determining the vacuum created by said force in centimeters of mercury.

Thus depending upon the amount of sand or clay present in the soil there may exist anything from a pure capillary suspension of the moisture therein to a molecular suspension thereof and it has been found that the apparatus operates most favorably when adjusted to the value of the absorption of a soil in which the moisture suspension is half capillary and half molecular in nature.

Having thus outlined the theory upon which my invention is based, it will now be described more in detail with reference to the accompanying drawing in which—

Fig. 1 shows a transverse section of the system taken on the line 1—1 of Fig. 2;

Fig. 2 shows a plan view;

Fig. 3 represents a curve plotted from readings taken with my apparatus;

Figure 4:
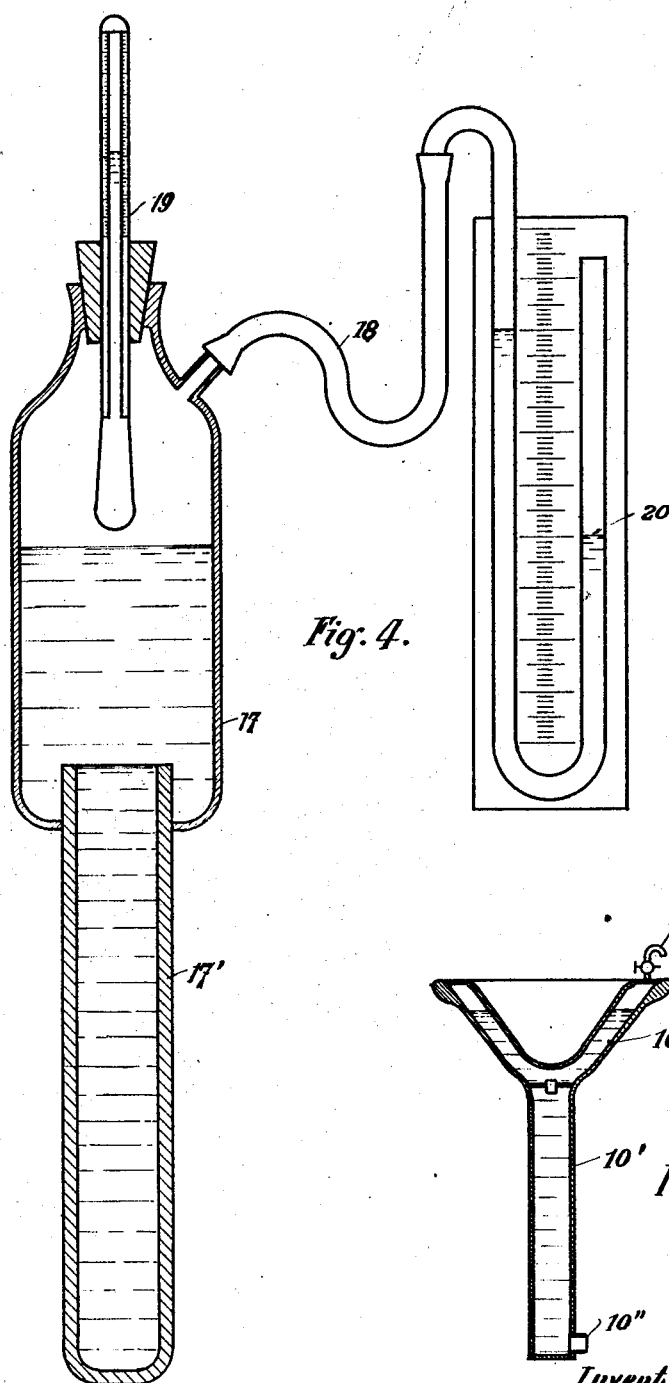
Fig. 4 shows a sectional view of my apparatus for measuring the degree of humidity of the soil.

Referring to the drawing and more particularly to Figs. 1 to 3, a little above the layer of earth which is reached by the plough, is located a series of porous tubes 1 adapted to permit water to pass through their walls, but which are impervious to air when moist. These tubes are located at suitable intervals and are interconnected by means of porous pipes which are also impervious to air when moist.

Each porous tube 1 is connected to a controlling reservoir 2 of glass provided with a cock 13 and a device 14 for measuring pressures. Each of the porous tubes 1 is provided with an additional controlling reservoir 3 having a control cock 4 and a drain cock 4' connected to a main conduit 5. This main conduit is connected by branches to two supply reservoirs $6^1$ and $6^2$ placed above the surface of the soil and interconnected at their lower portion by means of a tube T.

The two reservoirs $6^1$ and $6^2$ disposed on the same level serve to prevent disturbances arising in the reservoir $6^1$ from affecting the operation of the system.

These supply reservoirs $6^1$ and $6^2$ also serve for observing the progress of the irrigation, that is to say the passage of water from a reservoir 7 hereinafter referred to into the system. Moreover they permit refilling of the irrigation system or the removal of the water if necessary. They also permit better distribution and regulation of the water.

Without these controlling reservoirs $6^1$ and $6^2$, the system would not function regularly because pockets of air would form in the porous tubes. These pockets of air might, for instance, originate from a subsidence of the layers of earth or cracks which might form in the porous tubes.

When the system functions by drainage, that is to say, if the water flows to reservoir 7 from the tubes 1, the flow of the water is interrupted where these pockets of air form, and the aspiration of water becomes impossible.

The principal controlling reservoirs $6^1$ and $6^2$ prevent the interruption of the current of water and in this way a disturbance in the working of the system is avoided, which disturbance might take place owing to the entry of water into the porous tubes.

The principal controlling reservoirs $6^1$ and $6^2$ have opening therefrom an aspirator tube 16 with a cock 12 leading to a third auxiliary reservoir 7, the level of water in which is lower than that of the earth in which the porous tubes 1 are placed. Into the last mentioned reservoir 7 water is conducted from a suitable source 9 through a pipe 15, said reservoir being provided with an automatic valve 8 by means of which the desired level is maintained.

For irrigation of trees and layers of soil containing flowers, a second main conduit 5' is led off from reservoir $6^2$ and connected to porous tubes 11 similar to tubes 1, which in turn are connected by flexible couplings 11' to a series of porous tubes 10 disposed vertically. Tubes 10 are closed at their lower ends and open at the upper end into controlling vessels of glass, having openings which are two in number, the upper of which is provided with a tap 13' to allow for the escape of air, and the lower of which is in communication with the tubes 11.

Figure 5:
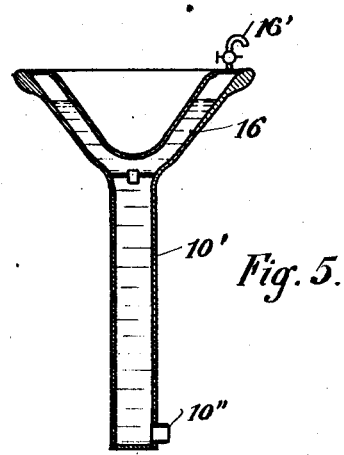
Fig. 5 shows a sectional view of my invention applied to a flower pot.

In Fig. 5 I have shown my invention applied to a flower pot consisting of an earth receptacle of hollow construction 16 opening into a tube 10' similar to tubes 10. Receptacle 16 is provided with a cock 16' similar to cock 13' and tube 10' is provided with an outlet 10" near the lower end thereof adapted to be connected to tubes 11 of the system through flexible couplings similar to elements 11'. In this embodiment as before tubes 10' are vertically disposed in the earth with receptacles 16 on the surface thereof.

The irrigating system operates in the following manner:

To charge the system, it is filled with water. For this purpose all the cocks located at the extremities of the porous tubes are opened. The cock 12 of the aspiration tube 16 is closed and the principal reservoirs for controlling the system $6^1$ and $6^2$ are filled with water. As said reservoirs are located at the highest part of the ground to be irrigated, the water runs into the porous tubes and fills them at the same time as the air escapes through the cocks 13. When the whole system has been charged and the porous tubes are saturated, the air cocks are closed. The cock 12 on the pipe 16 is opened and the system is put into communication with the lower water reservoir 7. Since the level of the water in the reservoir 7 is lower than that of the tubes embedded in the soil, owing to this difference in level, there is produced a certain difference in pressure throughout the whole system. The lower the level of the water in the reservoir 7 the greater the difference in pressure in the tubes.

As the whole system is filled with water and the porous tubes are saturated, the soil absorbs water by reason of its force of absorption through the porous walls. The whole system is therefore air tight and the porous tubes only allow water to pass through. The result is that the counter pressure in the tubes increases as well as the water, by reason of the difference in pressure, which counter pressure increases in the system and compensates for water which has been utilized in the earth.

The same quantity of water which the soil has drawn through the porous tubes rises from the reservoir into the system.

The automatic irrigation system permits the production of a favorable degree of moisture in the earth. This may be obtained by properly fixing the height of the level of water in the lower reservoir. The lower the level of water in the reservoir, the higher will be the counter pressure in the porous tubes and owing to this fact also the lower will be the degree of moisture in the soil.

On the other hand the less the difference in level between the reservoir and the system the greater the degree of moisture in the soil.

To determine the counter pressure in the tubes and the degree of moisture in the soil, the extremities of the porous tubes are provided with means for measuring the pressure. When the ratios between the force of absorption of a particular soil and its moisture content are known, then by means of a table, the irrigation system may be so arranged as to obtain always the desired degree of moisture. The regulation of the system is effected by raising or lowering the level of the water in the reservoir 7, making use of an automatic valve.

The soil can only draw water through the porous tubes when the water in these tubes is retained therein with a force which is less than the suction force of the soil for the water. But as the force of aspiration of each kind of soil for a given degree of humidity has a given value the soil continually draws water because the system has been so arranged as to have a counter-pressure in the tubes which is less than the force of suction of the soil.

Fig. 3 illustrates graphically the relation between the degree of moisture in the soil and the force of absorption, the abscissa indicating the former and the ordinate the latter. It will be seen from this that when the moisture content is a maximum the power of absorption is a minimum and when the moisture content is a minimum the power of absorption is a maximum. The curve is obtained by the use of the measuring device shown in Fig. 4 and hereafter explained. The favorable degree of moisture is shown by the dotted line in Fig. 3 which represents the limit between capillary and molecular suspension of moisture previously referred to.

When the degree of moisture in the soil increases, its power of absorption diminishes, and when a certain degree of moisture has been reached, the force of absorption becomes equal to the difference in height between the two levels of water in the reservoir 7 and of the porous tubes 1, so that the passage of water stops.

If the soil owing to too heavy rain acquires too high a degree of moisture, the water in excess is absorbed by the porous tubes and conducted to the reservoir 7 owing to the fact that this humidity in the soil is retained with a force which is less than the suction force of the porous tubes. It should, however, be noticed that the removal of water in excess is only possible when the soil has been irrigated up to the degree of capillary suspension, that is to say beyond the point of favorable moisture content, because it is only capillary forces which can move within the layers of soil. Molecularly suspended moisture cannot be removed from the soil.

The system of automatic irrigation of the soil functions correctly when the tubes and all their connections are absolutely air tight. If air penetrates into the system, it ceases to function. In order to observe the regularity of working of the system, a series of controlling devices are provided.

When the system commences to absorb water, this rises in the first instance from the reservoir 7 into the first controlling reservoir $6^1$, and then it penetrates through the junction pipe T into the second reservoir $6^2$ in the form of drops which can be easily seen. If owing to an excess of water in the ground the system functions as a drainage system, the water runs in the opposite direction and this may be observed by means of the controlling reservoir $6^2$, connected to the principal conduit.

For controlling or observing the air tightness of the tubes, the rows of tubes are provided with glass receptacles 2 furnished with cocks 13 already mentioned. The air which would have penetrated into the tubes then forces the water under the pressure of the column of water and penetrates into the receptacle 2. In addition, the counterpressure diminishes in the system and this may be read from the manometer 14. Each set of pipes 1 is connected to the principal conduit 5 by means of connections with cocks 4. In case of any disturbance arising in one of the conduits 1, the corresponding cock 4 is closed in order to cut this connection out of the system.

In Fig. 4 is shown an arrangement for measuring the degree of absorption of the soil. 17′ is the porous tube to be located in the soil, the degree of absorption of which is to be measured, on which is mounted a receptacle 17 furnished with a thermometer 19. This receptacle is connected by means of a tube 18 to a U-tube 20 filled with mercury, graduated to indicate exactly the degree of absorption of the soil.

What I claim as new and desire to secure by Letters Patent is:

1. An apparatus for the automatic irrigation of the soil comprising in combination a plurality of porous tubes, pervious to the passage of water but impervious to the passage of air, inserted into the soil, pipes impervious to air connected to said tubes, chambers provided with cocks connected to said porous tubes disposed above the soil, two closed reservoirs for water interconnected at their lower portions disposed above the level of the soil, means for connecting one of said reservoirs to said pipes, closable means associated with said reservoirs for filling the system with water, a main water tank having an open top so disposed that the level of the water therein will be below the level of the porous tubes in the soil, a downwardly extending tube projecting below the level of the water in said tank, means for connecting the upper end of said downwardly extending tube to the other of said reservoirs, a cock associated with said downwardly extending tube adapted to shut off said main tank from the upper reservoirs, and means for supplying water to said main tank automatically to maintain a constant water level therein.

2. An apparatus for the automatic irrigation of the soil comprising in combination a plurality of porous tubes, pervious to the passage of water but impervious to air connected to said tubes, chambers provided with cocks connected to the said porous tubes disposed above the soil, pressure indicating means connected to said chambers, two closed reservoirs for water interconnected at their lower portions disposed above the soil, pressure indicating means connected to said chambers, two closed reservoirs for water interconnected at their lower portions disposed above the level of the soil, means for connecting one of said reservoirs to said pipes, pressure indicating means connected to said reservoirs, closable means associated with said reservoirs for filling the system with water, a main water tank having an open top so disposed that the level of the water therein will be below the level of the porous tubes in the soil, a downwardly extending tube projecting below the level of the water in said main tank, means for connecting the upper end of said downwardly extending tube to the other of said two reservoirs, a cock associated with said downwardly extending tube adapted to shut off said main tank from the upper reservoirs, and means for supplying water to said main tank automatically to maintain a constant level of the water therein.

3. An apparatus for the automatic irrigation of the soil comprising in combination a plurality of porous tubes, pervious to the passage of water but impervious to the passage of air, inserted into the soil, pipes impervious to air connected to the said tubes, chambers provided with cocks connected to said porous tubes disposed above the soil, pressure indicating means connected to said chambers, two closed reservoirs for water interconnected at their lower portion disposed above the soil, means for connecting said reservoirs to said pipes, pressure indicating means connected to said reservoirs for filling the system with water, a main water tank having an open top so disposed that the level of the water therein will be below the level of the porous tubes in the soil, a downwardly extending tube projecting below the level of the water in said main tank, means for connecting the upper end of said downwardly extending tube to the other of said two reservoirs, a cock associated with said downwardly extending tube adapted to shut off said main tank from the upper reservoirs, means for supplying water to said main tank automatically to maintain a constant level of the water therein, and a plurality of cocks for isolating certain portions of said system.

In witness whereof I affix my signature.

BASIL KORNEFF.